United States Patent [19]

Livingston et al.

[11] Patent Number: 4,920,471

[45] Date of Patent: Apr. 24, 1990

[54] AC HIGH VOLTAGE POWER SUPPLY

[75] Inventors: Robert N. Livingston, Johnson City; Michael Kosteva, Endwell, both of N.Y.

[73] Assignee: Imagitek, Binghamton, N.Y.

[21] Appl. No.: 167,031

[22] Filed: Mar. 11, 1988

[51] Int. Cl.⁵ .......................................... H02M 3/335
[52] U.S. Cl. ...................................... 363/22; 363/56; 363/97
[58] Field of Search ...................... 363/18, 19, 22, 24, 363/26, 97, 133, 134, 56; 323/285

[56] References Cited

U.S. PATENT DOCUMENTS

| 3,564,393 | 2/1971 | Williamson | 363/21 X |
| 3,777,248 | 12/1973 | Vermolen | 363/22 |
| 4,061,957 | 12/1977 | Jan Vader | 363/22 |
| 4,146,832 | 3/1979 | McConnell | 323/285 |
| 4,318,170 | 3/1982 | Cabalfin | 363/22 X |
| 4,371,918 | 2/1983 | Schierjott | 363/22 |
| 4,510,562 | 4/1985 | Maeba | 363/19 |
| 4,519,023 | 5/1985 | Lester | 363/22 X |
| 4,524,412 | 6/1985 | Eng | 363/26 X |
| 4,686,617 | 8/1987 | Colton | 363/97 X |

Primary Examiner—Peter S. Wong
Assistant Examiner—Kristine Peckman
Attorney, Agent, or Firm—Kane, Dalsimer, Sullivan, Kurucz, Levy, Eisele and Richard

[57] ABSTRACT

The invention relates to a high voltage AC power supply which can be operated as either a constant current source with overvoltage protection or as a constant voltage source with current limiting protection. The power supply includes a sinusoidal transformer having a high turn winding and a sampling circuit on its secondary side for sampling voltage proportional to the load current. A comparator compares the sampled voltage to a reference voltage and supplies an error voltage to a buck regulator. The buck regulator converts the error voltage to a variable DC voltage which is fed to an oscillator formed by the primary winding of the transformer.

8 Claims, 3 Drawing Sheets

AC HIGH VOLTAGE POWER SUPPLY

BACKGROUND OF THE INVENTION

The present invention relates to a method and an apparatus for providing a high voltage A.C.-power supply for use in a reproduction machine such as an electrographic copier. The present invention more particularly relates to a power supply which can be operated as either a constant current source with overvoltage protection or as a constant voltage source with current limiting protection.

SUMMARY OF THE INVENTION

One of the principal objects of the invention is to provide a high voltage A.C. power supply for use in a reproduction machine wherein the power supply can be operated as either a constant current source with overvoltage protection or as a constant voltage source with current limiting protection.

This is attained by providing a power supply that includes a transformer having a high turns winding and a sampling circuit on its secondary side for sampling voltage proportional to the load current and a comparator for comparing the sampled voltage to a reference voltage and supplying an error voltage to a buck regulator which converts the error voltage to a variable D.C. voltage to supply the DC Power to an oscillator which in turn controls the amplitude of the AC voltage generated by the oscillator.

Further objects and advantages of the invention will be set forth in part in the following specification and in part will be obvious therefrom without being specifically referred to, the same being realized and attained as pointed out in the claims hereof.

DETAILED DESCRIPTION OF THE PREFERRED EMBODIMENT

Figure 1:
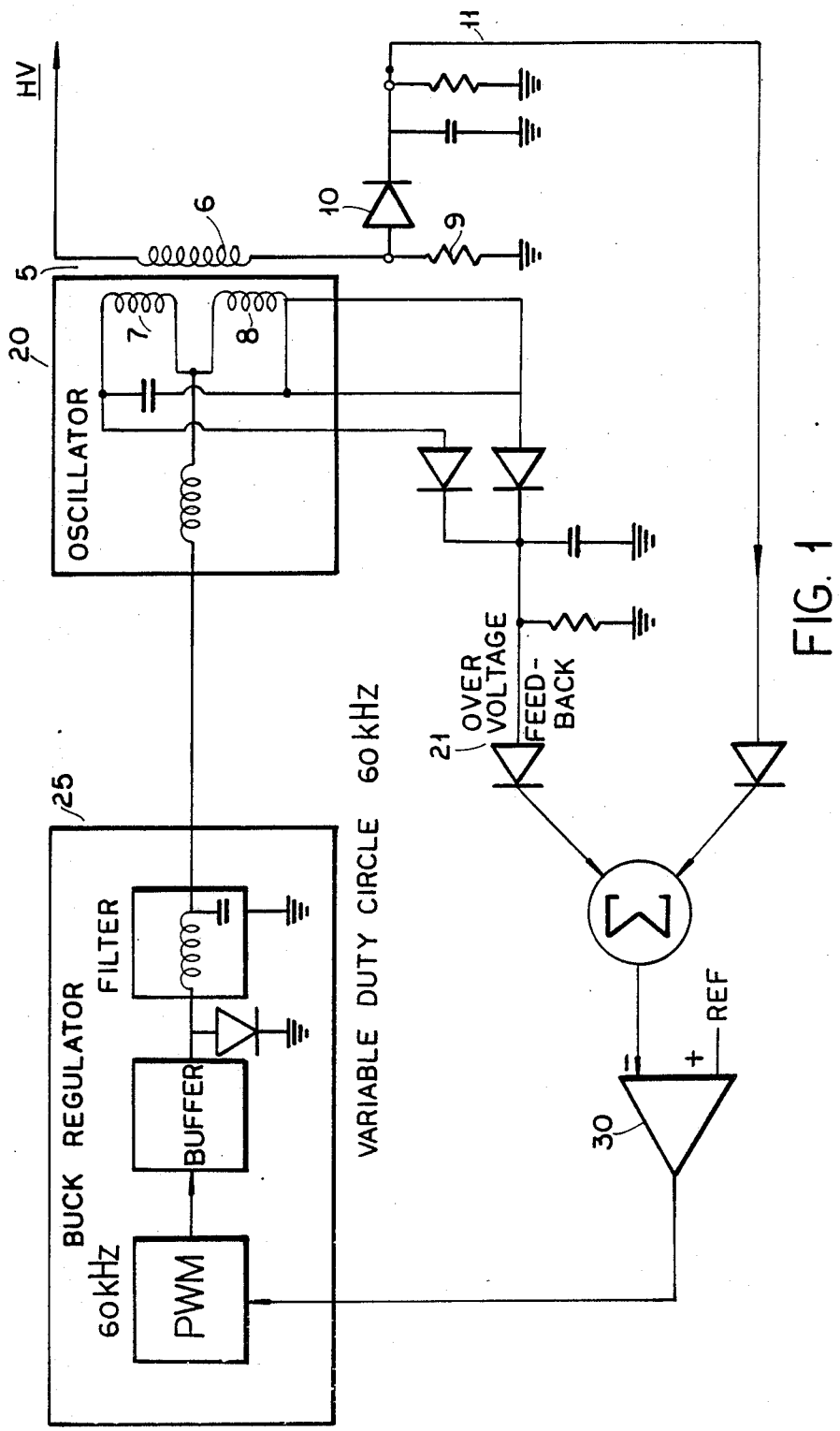
FIG. 1 is a simplified schematic of a preferred embodiment of the invention.

Referring now to the drawings, and in particular to FIG. 1 which shows, in simplified form, a preferred embodiment of the invention operating with a constant current supply and overvoltage protection.

FIG. 1 shows primary windings 7 and 8 and secondary winding 6 which form an oscillatory transformer 5 having a high turns ratio winding. Ground leg 11 of the secondary side of the transformer 5 includes a sampling resistor 9 for sampling a voltage proportional to the current supplied to the load and a rectifier 10 for sampling a voltage proportional to the current supplied to a load such as a corona device (not shown). The sampled voltage is then supplied to a comparator 30 which compares the sampled voltage with a reference voltage. Any error signal generated by the comparator 30 is fed into a Buck Regulator 25 which is a particular type of voltage regulator for converting the error signal into a variable D.C. output voltage which is then supplied to a sinusoidal oscillator 20. The sinusoidal oscillator 20 includes feedback circuitry 21 for overvoltage protection.

Figure 2:
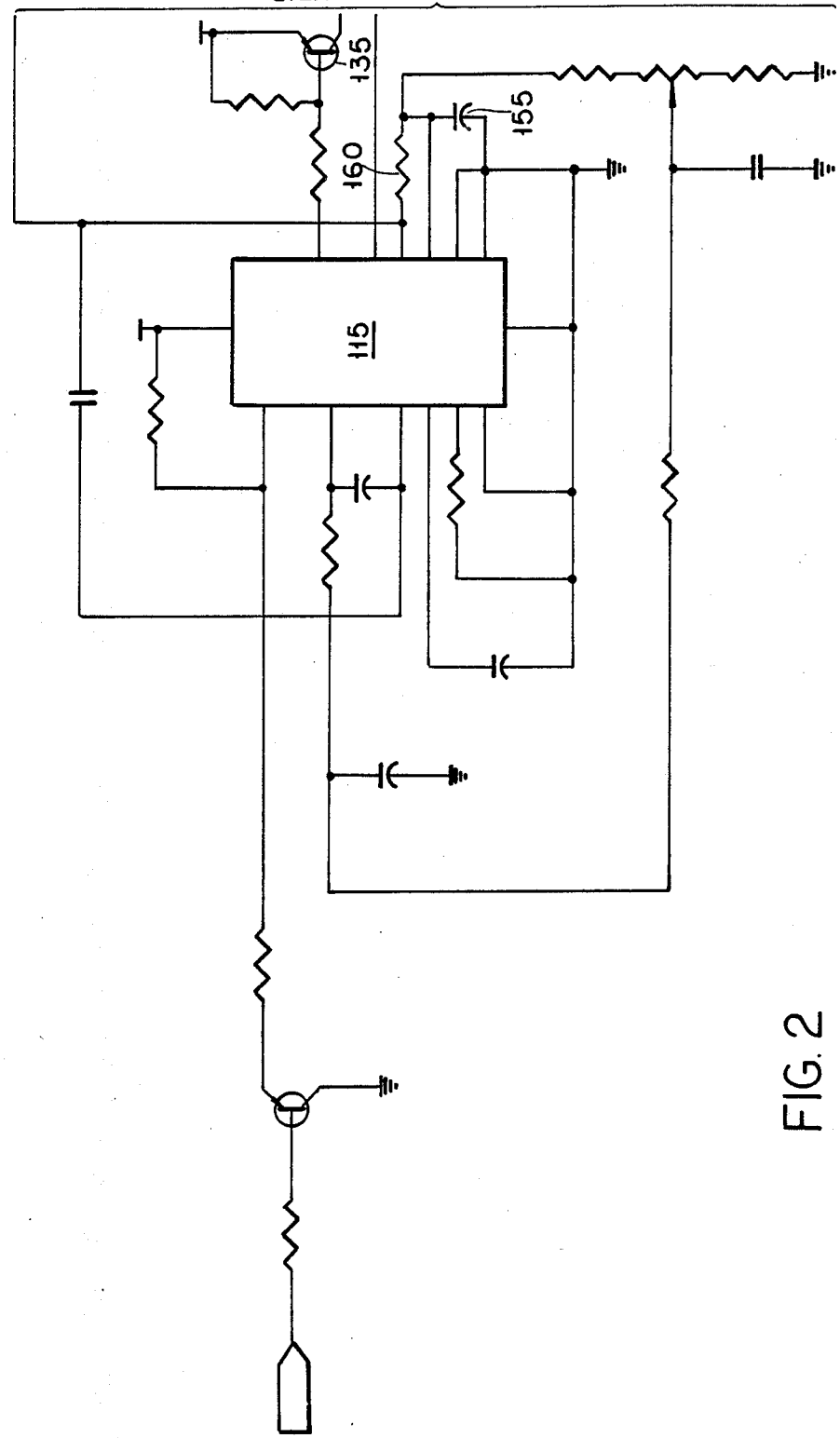
FIG. 2 is a detailed schematic of a preferred embodiment of the invention.
Figure 2:
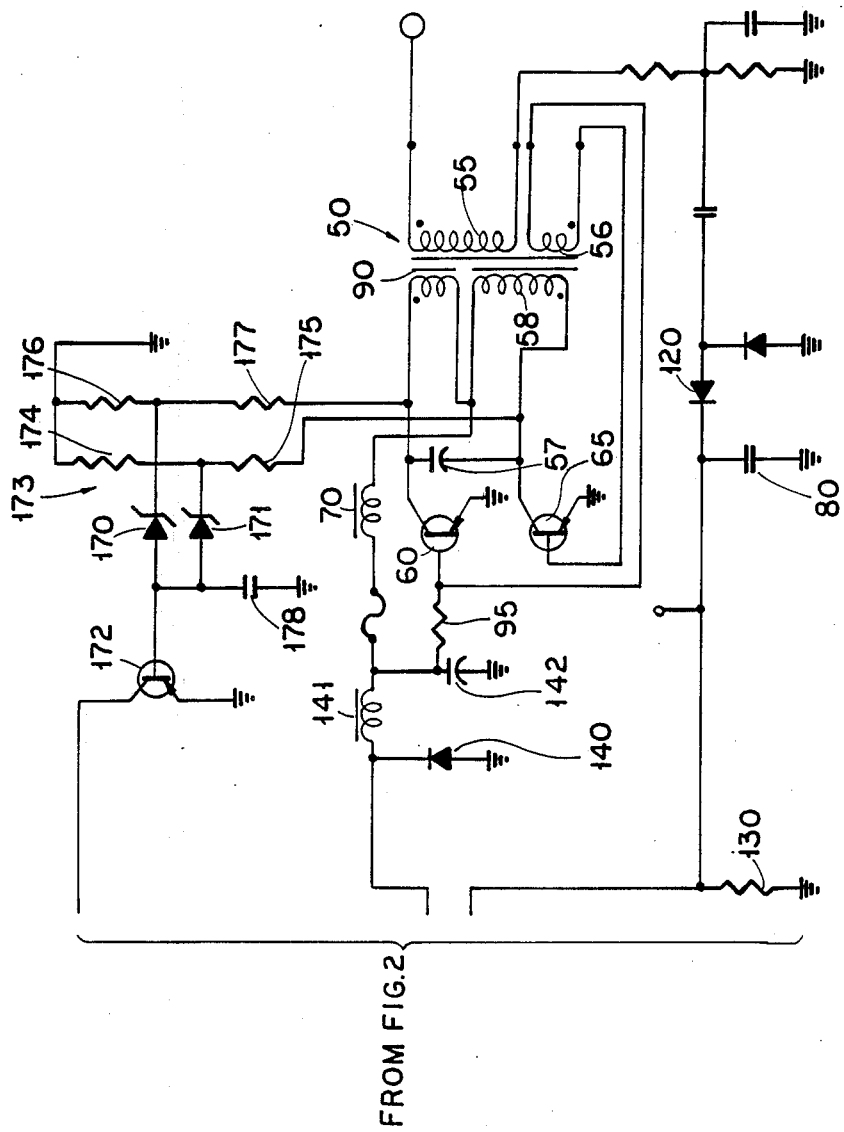

A parallel resonant self oscillating inverter 50 provides voltage feedback for the power supply shown in FIG. 2. The inverter 50 is formed by a transformer primary winding 58 and capacitance 57, a regenerative feedback winding 56 and transistors 60 and 65. By including the feedcurrent inductance 70 in the circuit the frequency of oscillation can be determined by the capacitance 57 and the inductance of the primary winding 58 (the leakage and magnetizing inductances). Since the inverter 50 is a voltage feedback type inverter, frequency stability depends on the applied voltage at the center tap 58 of the transformer 90. The resulting waveform is sinusoidal and has a 50% duty cycle. The values chosen in FIG. 2 are for an oscillation frequency of approximately 1000 hertz. Resistor 95 together with the regenerative winding 56 provide a variable current drive to the bases of transistors 60 and 65, keeping the two transistors in saturation during alternate half cycles, thus maintaining self oscillation. It also assists in the initial start up of the inverter 50.

The output is regulated by either voltage regulation or by current regulation through a resistor in the return leg of the secondary. These voltages are rectified, filtered and fed, as D.C. error voltages, to an integrated circuit 115 such as IC chip MC 34060P. Diode 120, and resistor 130 provide the current feedback signals. Over voltage protection is provided through diodes 170, 171 and transistor 172.

Current regulation occurs when the signal from diode 120 dominates the signal from transistor 172. Conversely if the signal from transistor 172 dominates, over voltage protection will occur. A sampling network 173 comprising diodes 170, 171; resistors 174, 175, 176 and 177; and capacitor 178 samples voltage proportional to the secondary side voltage.

Integrated circuit 115 includes error amplifiers, a voltage reference, an internal oscillator, and a buffer driver stage used to drive the base of transistor 135. The frequency of oscillation is determined by the values selected for capacitance 155 and resistor 160. One error amplifier is used as a comparator to inhibit the drive to the buck regulator. The other amplifier serves as the D.C. error amplifier. The duty cycle controlled output regulates the saturation period or "on" time of transistor 135 as a function of the error amplifier's output and the current output required. Inductance 141 and capacitance 142 form the low pass filter for the buck regulator. Diode 140 protects transistor 135 during its "off" time.

The feedback signal voltage is then compared to the adjustable reference of integrated circuit 115. Integrated circuit 115 along with transistor 135, inductance 141, diode 140, and capacitance 142 form the heart of a high frequency buck regulator operating at approximately 60 kilohertz. This regulator is used to convert the fixed DC input voltage to a variable output voltage source for closed loop control. The buck regulator takes power from the primary voltage source in pulses. The regulated DC voltage is obtained by averaging the duration of these pulses which depend on the line voltage. The error voltage or signal is converted by integrated circuit 115 to a variable duty cycle signal to drive the base of transistor 135.

We wish it to be understood that we do not desire to be limited to the exact detail of construction shown and described, for obvious modifications will occur to a person skilled in the art.

Similarly, the scope of this invention is not limited to a sinusoidal oscillator. For example, a square wave oscillator could be adapted to control the amplitude of the AC signal in keeping the concepts taught in this invention.

Having thus described the invention, what we claim as new and desire to be secured by Letters Patent is as follows:

1. A high voltage AC power supply for use in a reproduction machine, comprising:
    a transformer having a high turns winding ratio, including a primary side having a low voltage winding, said primary side including means for sampling voltage proportional to secondary side voltage in said power supply;
    said transformer having a high voltage secondary winding including means for sampling a load current through said winding;
    comparing means adapted to receive and compare said voltage from said current sampling means with a reference voltage and to generate an error signal;
    a buck regulator adapted to receive said error signal from said comparator, said buck regulator including means to convert said error signal into a variable DC voltage signal;
    an oscillator adapted to receive said variable DC voltage signal from said buck regulator, said oscillator including overvoltage protection means for said power supply; and
    inductive means for limiting current surge of said variable DC voltage signal to said overvoltage protection means.

2. A power supply according to claim 1 wherein said oscillator is sinusoidal.

3. A power supply according to claim 2 wherein said secondary side has a ground leg and said current sampling means includes a sampling resistor and a rectifier connected thereto.

4. A power supply according to claim 3 wherein said oscillator includes said primary side of said transformer.

5. A power supply according to claim 1 wherein said comparing means is a comparator.

6. A power supply according to claim 1 wherein said overvoltage protection means is a feedback circuit connecting said oscillator to said comparing means.

7. A high voltage sinusoidal AC power supply comprising:
    a transformer having a primary side and a secondary side, said primary side including a low voltage primary winding and said secondary side including a regenerative feedback winding;
    first and second transistors, said primary winding having two ends each connected to a respective collector of said first and second transistors;
    a capacitor connected across the collectors of said first and second transistors thereby in combination with said primary winding establishing a resonant frequency, said regenerative feedback winding having two ends each connected to a respective base of said first and second transistors, said regenerative feedback winding, said capacitor and said first and second transistors forming a self oscillating inverter of said resonant frequency;
    means for feeding primary voltage into a peak detector and comparator whose error signal is fedback to a buck regulator to provide overvoltage limiting;
    inductive means limiting current from said buck regulator; and
    means for regulating output current of the power supply, said regulating means being adapted to receive voltage from current sampling means and adjust DC supply voltage to regulate total AC load current.

8. A power supply according to claim 7 wherein said regulating means includes voltage regulator means, current regulation means and means for determining whether the output is regulated by said voltage regulating means or by said current regulation means.

* * * * *